(12) United States Patent
Choi et al.

(10) Patent No.: US 9,970,836 B2
(45) Date of Patent: May 15, 2018

(54) MULTI-AXIAL FORCE SENSOR AND GRASPER FOR SENSING MULTI-AXIAL FORCE USING THE SAME

(71) Applicant: RESEARCH AND BUSINESS FOUNDATION SUNGKYUNKWAN UNIVERSITY, Suwon-si (KR)

(72) Inventors: Hyouk Ryeol Choi, Gunpo-si (KR); Yong Bum Kim, Goyang-si (KR); Ui Kyum Kim, Anseong-si (KR); Dong Yub Seok, Daegu (KR); Dong Hyuk Lee, Cheongju-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 95 days.

(21) Appl. No.: 15/094,116

(22) Filed: Apr. 8, 2016

(65) Prior Publication Data
US 2016/0299022 A1    Oct. 13, 2016

(30) Foreign Application Priority Data
Apr. 10, 2015    (KR) .......................... 10-2015-0050702

(51) Int. Cl.
*G01L 5/22*    (2006.01)
*G01L 5/16*    (2006.01)

(52) U.S. Cl.
CPC ............... *G01L 5/226* (2013.01); *G01L 5/165* (2013.01)

(58) Field of Classification Search
CPC .......... G01L 5/226; G01L 5/228; G01L 5/165
See application file for complete search history.

(56) References Cited

U.S. PATENT DOCUMENTS

| | | | | | |
|---|---|---|---|---|---|
| 3,904,234 | A | * | 9/1975 | Hill | .......................... B25J 15/04<br>250/231.1 |
| 4,872,803 | A | * | 10/1989 | Asakawa | ............... B25J 9/1015<br>294/119.1 |
| 5,245,872 | A | * | 9/1993 | Cooper | ................. G01L 1/2243<br>73/161 |
| 5,293,781 | A | * | 3/1994 | Kaiser | ................ G01P 15/0894<br>250/307 |
| 5,373,747 | A | * | 12/1994 | Ogawa | .................. B25J 13/084<br>73/862.041 |

(Continued)

FOREIGN PATENT DOCUMENTS

KR    10-2013-0032073 A    4/2013

*Primary Examiner* — Lisa Caputo
*Assistant Examiner* — Philip Cotey
(74) *Attorney, Agent, or Firm* — NSIP Law

(57) ABSTRACT

Disclosed are a multi-axial force sensor capable of measuring multi-axial force and a grasper for sensing multi-axial force using the same. The multi-axial force sensor includes: a first operating section which includes a first member, and a first protrusion module formed protruding from one side of the first member; an elastic section which is formed at one end of the first member; a second operating section which includes a second member formed with one end to face one end of the first member with the elastic section therebetween, and a second protrusion module formed protruding from one side of the second member to face the first protrusion module; and an electrode section which is formed in the first protrusion module. With this, there is provided a force sensor capable of precisely measuring force through a simple structure.

16 Claims, 5 Drawing Sheets

(56) References Cited

U.S. PATENT DOCUMENTS

| | | | |
|---|---|---|---|
| 5,421,213 A * | 6/1995 | Okada | G01L 1/144 73/718 |
| 6,530,283 B2 * | 3/2003 | Okada | G01L 5/165 73/780 |
| 9,265,570 B2 * | 2/2016 | Heard | A61B 18/1442 |
| 9,421,069 B2 * | 8/2016 | Choi | A61B 5/0053 |
| 2003/0097060 A1 * | 5/2003 | Yanof | A61B 34/70 600/424 |
| 2004/0244505 A1 * | 12/2004 | Takenaka | B25J 13/081 73/862.541 |
| 2012/0017703 A1 * | 1/2012 | Ikebe | B25J 13/083 73/862.626 |
| 2012/0144932 A1 * | 6/2012 | Ikebe | G01L 1/04 73/862.041 |
| 2012/0205931 A1 * | 8/2012 | Ohta | B25J 13/085 294/213 |
| 2012/0239195 A1 * | 9/2012 | Summer | B25J 5/005 700/258 |
| 2013/0104672 A1 * | 5/2013 | Kim | G01L 5/166 73/862.624 |
| 2013/0160567 A1 * | 6/2013 | Ota | G01L 1/162 73/862.68 |
| 2013/0253705 A1 * | 9/2013 | Goldfarb | A61F 2/583 700/260 |
| 2013/0319135 A1 * | 12/2013 | Okada | G01L 1/14 73/862.043 |
| 2014/0028118 A1 * | 1/2014 | Sakano | H02K 7/00 310/12.14 |
| 2014/0142574 A1 * | 5/2014 | Heard | A61B 18/1442 606/52 |
| 2014/0174204 A1 * | 6/2014 | Chen | G01L 1/142 73/862.626 |
| 2014/0238174 A1 * | 8/2014 | Ikebe | B25J 9/1694 74/490.01 |

* cited by examiner

A —— A

B —— B

MULTI-AXIAL FORCE SENSOR AND GRASPER FOR SENSING MULTI-AXIAL FORCE USING THE SAME

CROSS-REFERENCE TO RELATED APPLICATION

This application claims priority from Korean Patent Application No. 10-2015-0050702, filed on Apr. 10, 2015 in the Korean Intellectual Property Office, the disclosure of which is incorporated herein by reference.

BACKGROUND OF THE INVENTION (a) Field of the Invention

The present invention relates to a multi-axial force sensor and a grasper for sensing multi-axial force using the same, and more particularly to a multi-axial force sensor capable of accurately measuring force through a simple structure and a grasper for sensing multi-axial force using the same.

(b) Description of the Related Art

In recent industrial sites, a robot has been utilized even for assembling, polishing, deburring or the like work in accordance with trends toward productivity improvement and factory automation Further, the robot has been required to have various functions as a field of utilizing the robot expands, and thus there arises a necessity of accurately measuring and controlling force in many directions in addition to position control of the robot.

The force acts in any directions within a 3D space. Therefore, if a force sensor having one degree of freedom is used, a lot of force sensors are needed.

However, the use of many force sensors is not preferable due to a limited space. Accordingly, various devices have been developed to use a fewest number of force sensors in measuring multi-axial force.

In a particular case of minimally invasive surgery where an operating surgeon remotely controls a robot, there is a need of a force sensor that accurately informs the operating surgeon of pressure applied from a grasper to an affected area while the grasper is used to perform a surgery operation.

Further, the grasper of the robot has to be minified to make a minimum incision, and it is therefore difficult to mount many sensors to the grasper of the robot. Accordingly, there has been required a device that can accurately informs an operating surgeon of the multi-axial force applied to the grasper through the minimum number of sensors.

SUMMARY OF THE INVENTION

Accordingly, the present invention is conceived to solve the foregoing problems, and an aspect of the present invention is to provide a multi-axial force sensor and a grasper for sensing multi-axial forces using the same.

Another aspect of the present invention is to provide a multi-axial force sensor capable of accurately measuring force through a simple structure and a grasper for sensing multi-axial force using the same, Still another aspect of the present invention is to provide a multi-axial force sensor capable of accurately measuring force applied from a grasper of a robot to an affected area during a surgery operation and a grasper for sensing multi-axial force using the same, According to an embodiment of the present invention, there is provided a multi-axial force sensor including: a first operating section which includes a first member, and a first protrusion module formed protruding from one side of the first member; an elastic section which is formed at one end of the first member; a second operating section which includes a second member formed with one end to face one end of the first member with the elastic section therebetween, and a second protrusion module formed protruding from one side of the second member to face the first protrusion module; and an electrode section which is formed in the first protrusion module, wherein the electrode section, together with the second operating section, forms an electrostatic capacity when electric power is supplied thereto, and multi-axial force applied to the first operating section or the second operating section is obtained based on change in a relative position between the electrode section and the second operating section.

The electrode section may include: a first electrode which is formed at an end of the first protrusion module and includes two or more electrodes spaced apart having different angles; and a second electrode which is formed at a lateral surface of the first protrusion module and spaced by a predetermined distance or more from the first electrode, and the first electrode may form an electrostatic capacity together with the second protrusion module when electric power is supplied thereto, and the second electrode forms an electrostatic capacity together with the second member when electric power is supplied thereto.

The first protrusion module may be formed protruding from one side of the first member and having an "L" shape, in which an end of the first protrusion module has the same shape as the first electrode forming a crossing angle, and the second protrusion module may be spaced apart at a predetermined distance from and formed surrounding the end of the first protrusion module.

The first electrode may be adjacent to the second protrusion module rather than the second member and the second electrode may be adjacent to the second member rather than the second protrusion module even though a relative position between the electrode section and the second operating section is changed by external force.

The second operating section may further include a proximity module formed protruding from a corresponding surface of the second member facing the second electrode.

According to an embodiment of the present invention, there is provided a grasper for sensing multi-axial force, the grasper including: two multi-axial force sensors; a rotary shaft which couples one end of first members or one end of the first members of second members respectively provided in the two multi-axial force sensors; a motive power section which supplies motive power so that the two multi-axial force sensors can perform a grasping operation with respect to the rotary shaft; and a calculator which obtains force applied to the force sensor, wherein the multi-axial force sensor includes the multi-axial force sensor according to any one of claims 2 to 5, and the calculator obtains multi-axial force applied to the two multi-axial force sensors based on change in if the electrostatic capacity measured by the first electrode or the second electrode of the two multi-axial force sensors is changed corresponding to the grasping operation.

The calculator may include a table where values of the multi-axial force are previously stored corresponding to the electrostatic capacities of the first electrode and the second electrode, and calculates multi-axial force applied to the two multi-axial force sensors by comparing the electrostatic capacities measured in the first electrode and the second electrode with the values of the table.

BRIEF DESCRIPTION OF THE DRAWINGS

The above and/or other aspects of the present invention will become apparent and more readily appreciated from the following description of the exemplary embodiments, taken in conjunction with the accompanying drawings, in which:

FIG. 10 shows an operation of the grasper for sensing multi-axial force.

DETAILED DESCRIPTION OF THE EMBODIMENTS

The present invention relates to a multi-axial force sensor and a grasper for sensing multi-axial force using the same, and the multi-axial force sensor and the grasper for sensing multi-axial force using the same will be described with reference to FIG. 1 to FIG. 10.

Figure 1A:
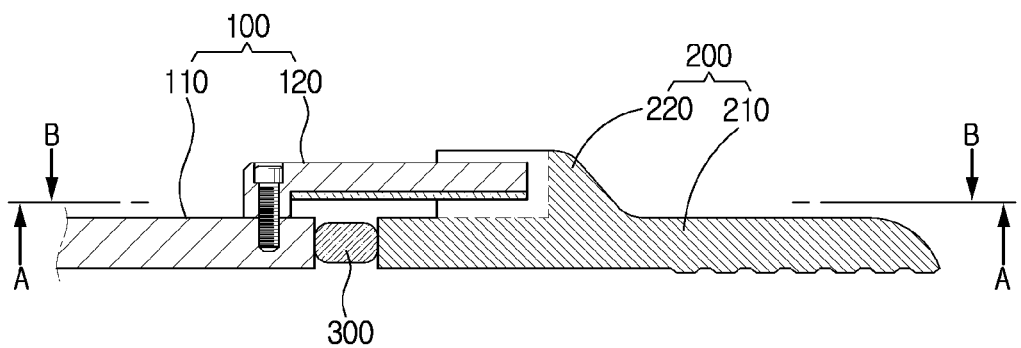
FIG. 1A shows a multi-axial force sensor according to an embodiment of the present invention.
Figure 1B:
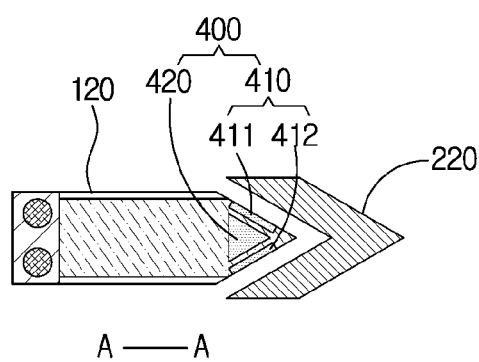
FIG. 1B and FIG. 10 are plan views respectively taken along lines A-A and B-B of FIG. 1A.
Figure 1C:
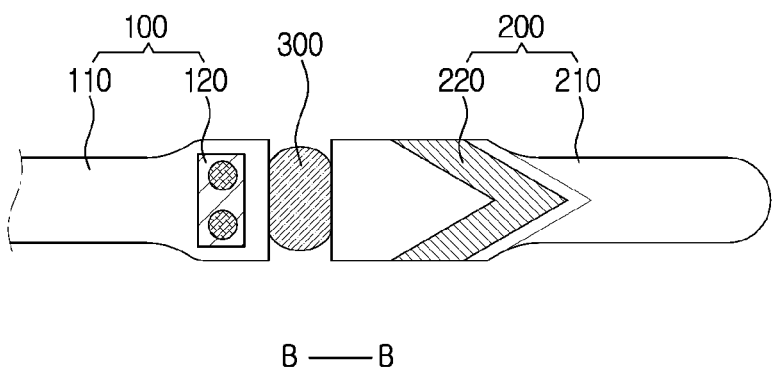

FIG. 1 shows the multi-axial force sensor according to an embodiment of the present invention.

As shown therein, the multi-axial force sensor according to an embodiment of the present invention includes a first operating section 100, a second operating section 200, an elastic section 300 and an electrode section 400.

The first operating section 100 includes a first member 110 and a first protrusion module 120 formed protruding from one side of the first member 110, and the second operating section 200 includes a second member 210 and a second protrusion module 220 formed protruding from one side of the second member 210.

Further, the first ends of the first member 110 and the second member 210 are connected to each other with the elastic section 300 therebetween.

The elastic section 300 is a member having elasticity. The elastic section 300 is compressed when external force is applied to the first member 110 or the second member 210 and restored when the external force is released, thereby controlling a position change between the first member 110 and the second member 210.

Further, the first protrusion module 120 formed protruding from one side of the first member 110 and the second protrusion module 220 formed protruding from one side of the second member 210 are spaced apart from and face each other, and therefore a space between the first protrusion module 120 and the second protrusion module 220 is controlled by the elastic section 300 when external force is applied to the first member 110 or the second member 210.

The electrode section 400 includes an electrode formed in the first protrusion module 120, and, together with the second operating section 200, forms an electrostatic capacity by receiving electric power from the exterior.

As shown in the plan views taken along the lines A-A and B-B of FIG. 1, the electrode section 400 is an electrode formed on one surface of the first protrusion module 120 and spaced apart from the second protrusion module 220.

At this time, the second operating section 200 may be formed as an electric conductor having a ground connection in order to form the electrostatic capacity together with the electrode section 400.

In the multi-axial force sensor according to the present invention, the elastic section 300 allows a relative position between the electrode section 400 formed in the first operating section 100 and the second operating section 200 to be changed when external force is applied thereto. At this time, an electrostatic capacity formed in between the electrode section 400 and the second operating section 200 is also varied depending on the relative position. With the varying electrostatic capacity, it is possible to obtain the external force applied to the first operating section 100 or the second operating section 200.

There may be a difference in the relative position between the electrode section 400 and the second operating section 200 in accordance with the elasticity of the elastic section 300. Thus, the elasticity of the elastic section may be adjusted corresponding to conditions to thereby cause a change in the electrostatic capacity.

Although the same external force is applied to the first operating section 100 or the second operating section 200, high elasticity of the elastic section 300 causes a large change in the relative position and low elasticity of the elastic section causes a small change in the relative position.

That is, if the elastic section 300 has low elasticity causing a small change in the relative position, a range of measuring force becomes wider but it is difficult to measure the force precisely. On the other hand, if the elastic section 300 has high elasticity causing a large change in the relative position, it is possible to measure force more precisely but a range of measuring the force becomes narrower since there is a limit to compress the elastic section. Accordingly, the elastic section is selected to have suitable elasticity in accordance with conditions.

Further, the electrode section 400 according to the present invention may have various electrodes to sense multi-axial force.

Referring to FIG. 3 to FIG. 8, the structure of the electrode section 400 and the method of measuring multi-axial force using the same are as follows.

The electrode section 400 according to the present invention may include a first electrode 410 for measuring x- and y-axial force of external force applied to the first operating section 100 or the second operating section 200, and a second electrode 420 for measuring z-axial force.

Figure 2:
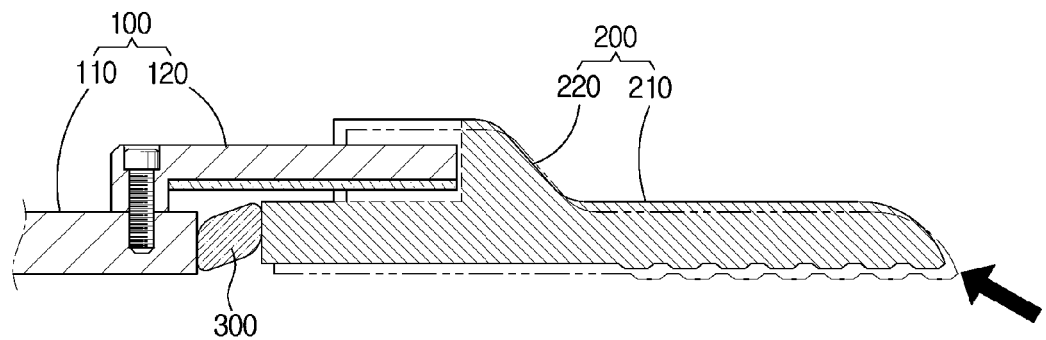
FIG. 2 shows an operation of when external force is applied to the multi-axial force sensor.

As shown in FIG. 1 or FIG. 2, the first electrode 410 includes two or more electrodes spaced having different angles and is formed at an end of the first protrusion module 120.

Figure 3:
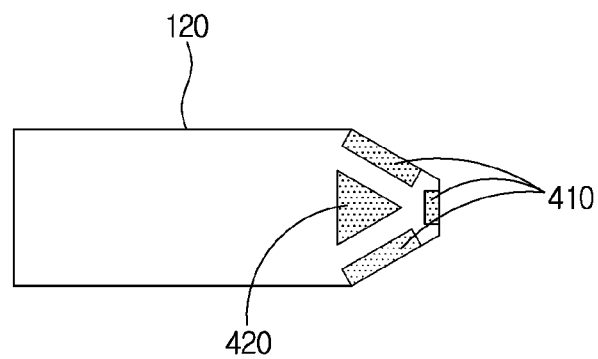
FIG. 3 shows an electrode section according to another embodiment.

FIG. 1 shows the first electrode using two electrodes, and FIG. 3 shows the first electrode using three electrodes. Likewise, the number and arrangement of electrodes used for the first electrode may be variously given.

If the number of electrodes used for the first electrode increases, it is possible to measure force more precisely but a more complicated structure is required. Accordingly, the number of electrodes is determined in accordance with conditions.

To arrange the first electrode 410, the first protrusion module 120 may be formed protruding from one side of the first member 110 and having an "L" shape. At this time, the end of the first protrusion module 120 has the same shape as the first electrode 410 forming a crossing angle, and it is thus possible to minimize a wasted space for the first protrusion module 120.

When electric power is supplied to the first electrode 410, it forms an electrostatic capacity together with the second protrusion module 220 having an electric potential of the ground.

Figure 4:
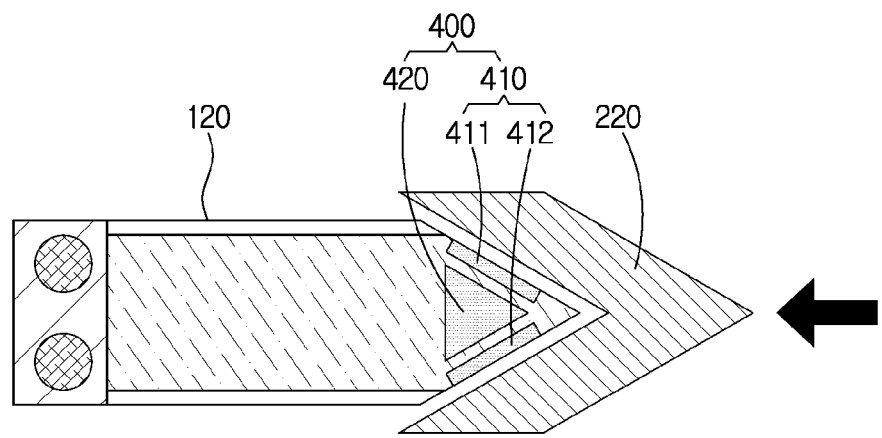
FIGS. 4 to 7 show change in position between the electrode section and a second protrusion module when external force is applied thereto.
Figure 5:
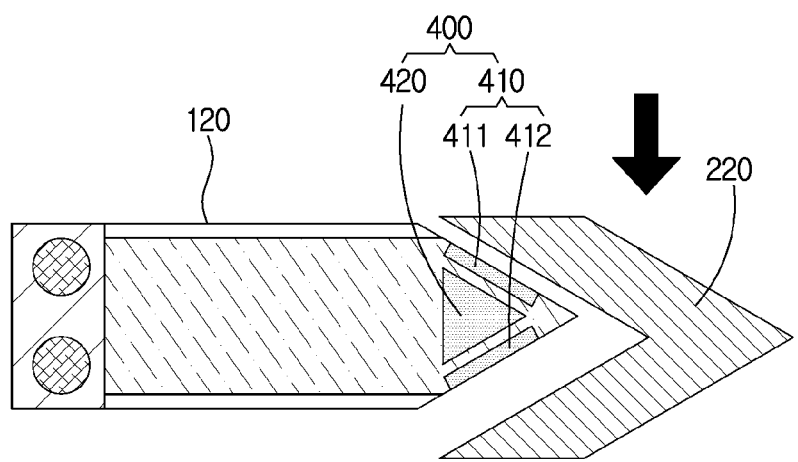
Figure 6:
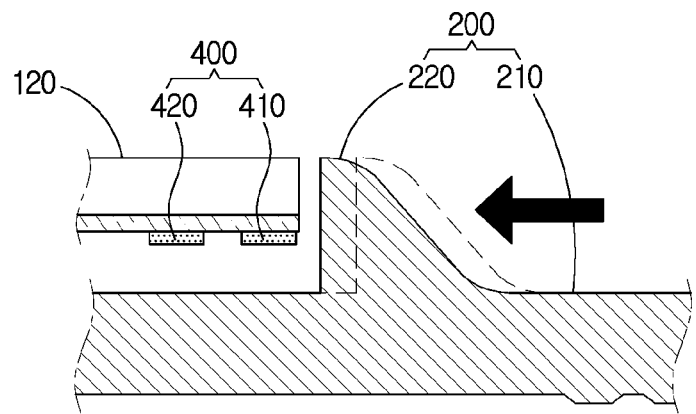

Referring to FIG. 4 to FIG. 6, the position change between the electrode section and the second protrusion module when external force is applied thereto will be described in detail. As shown in FIG. 4, if external force is applied to the second protrusion module in a direction of an arrow, distances between two electrodes 411 and 412 of the first electrode and the second protrusion module 220 are shortened, thereby increasing the electrostatic capacities respectively measured in the two electrodes 411 and 412.

On the other hand, as shown in FIG. 5 and FIG. 6, if external force is applied to the second protrusion module in a direction of an arrow, a distance between the first electrode 411 of the first electrode 410 and the second protrusion module 220 is shortened to thereby increase the electrostatic capacity, but the distance between the electrode 412 and the second protrusion module 220 is lengthened to thereby decrease the electrostatic capacity.

Like this, the electrostatic capacities formed in the electrodes 411 and 412 are different in accordance with directions of external force applied to the second protrusion module. Based on these features of the first electrode 410, it is possible to measure x- and y-axial force of the external force applied to the first operating section 100 or the second operating section 200.

As shown in the accompanying drawings, the second electrode 420 is an electrode spaced apart from the first electrode 410 and forms an electrostatic capacity together with the second member 210 having an electric potential of the ground when electric power is supplied to the second electrode 420.

Figure 7:
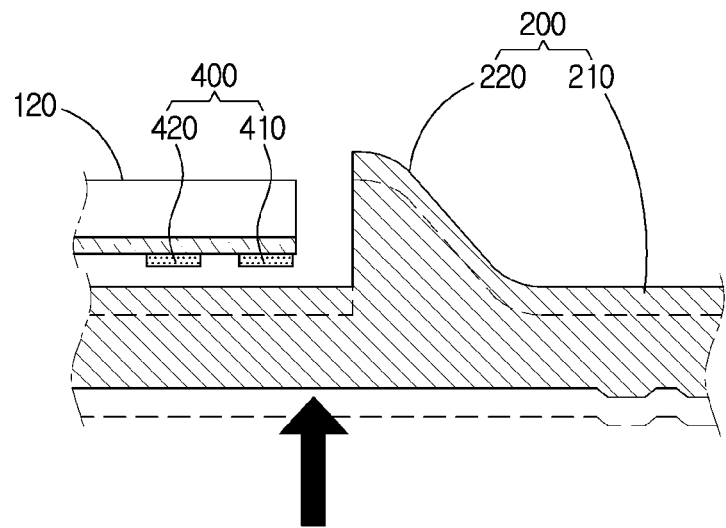

If external force is applied to the second member 210 in the arrow direction as shown in FIG. 7, a distance between the second electrode 420 and the second member 210 is shortened to thereby increase the electrostatic capacity. Based on these features of the second electrode 420, it is possible to measure z-axial force of the external force applied to the first operating section 100 or the second operating section 200.

By the way, the distance between the first electrode 410 and the second member 210 is shorter than the distance between the first electrode 410 and the second protrusion module 220 as the second member 210 gets closer to the first electrode 410 and the second electrode 420 by the external force applied in the arrow direction as shown in FIG. 7. In this case, the electrostatic capacity may be formed in between the first electrode 410 and the second member 210 and therefore the first electrode cannot perform its own function.

To solve this problem, the first electrode 410 has to be adjacent to the second protrusion module 220 rather than the second member 210 and the second electrode 420 has to be adjacent to the second member 210 rather than the second protrusion module 220 even though the relative position between the electrode section 400 and the second operating section 200 is changed by external force.

Figure 8:
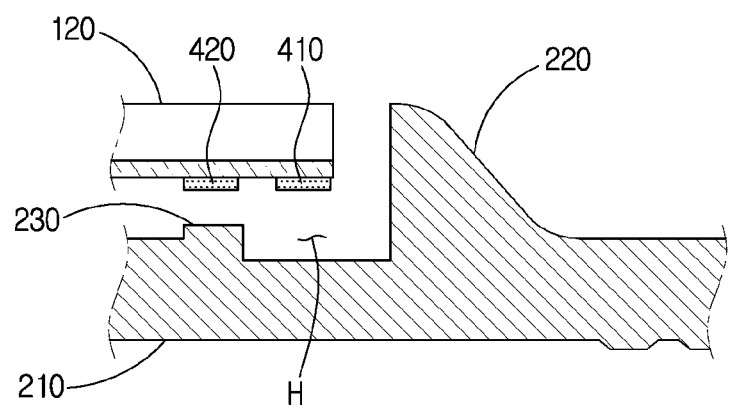
FIG. 8 shows a second operating section according to another embodiment.

FIG. 8 shows a structure of the second operating section 200, which is improved to solve the foregoing problem. Referring to FIG. 8, the second operating section 200 further includes a proximity module 230 formed protruding from a corresponding surface of the second member 210 facing the second electrode 420, thereby securing a space between the first electrode 410 and the second member 210. Further, a groove H may be formed in a corresponding surface of the second member 210 facing the first electrode 410, thereby securing the space between the first electrode 410 and the second member 210.

With this structure of the second operating section 200, the electrostatic capacity is formed in between the first electrode 410 and the second protrusion module 220, and it is thus possible to solve the problem that the first electrode cannot perform its own function.

Below, a grasper for sensing multi-axial force using the multi-axial force sensor according to the present invention will be described with reference to FIG. 9 and FIG. 10.

Figure 9:
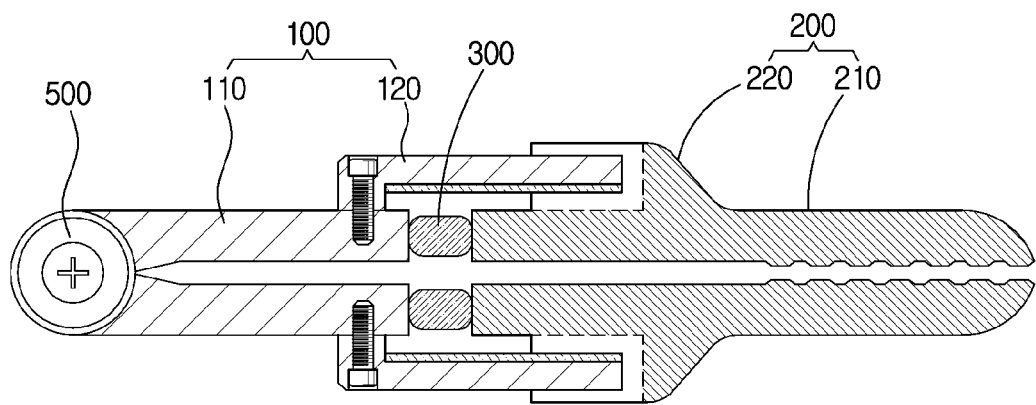
FIG. 9 shows a grasper for sensing multi-axial force according to an embodiment of the present invention.

As shown in FIG. 9, the grasper for sensing multi-axial force according to the present invention includes two multi-axial force sensors, a rotary shaft 500, a motive power section (not shown), and a calculator (not shown).

First, the structure of the multi-axial force sensor is the same as described above, and therefore repetitive descriptions thereof will be avoided as necessary.

The rotary shaft 500 is a member by which two multi-axial force sensors are coupled to thereby perform a grasping operation.

FIG. 9 shows a structure that the other ends of the first members 110 respectively provided in two multi-axial force sensors are connected to the rotary shaft so that the second members 210 can serve as distal ends for grasping an object T.

Alternatively, the rotary shaft 500 may couple the other ends of the second members 210 respectively provided in the two multi-axial force sensors. In this case, the first members 110 are used as distal ends for grasping an object.

The motive power section is a device for supplying motive power so that the two multi-axial force sensors can perform a grasping operation with respect to the rotary shaft. For example, the motive power section may control the operations of the two multi-axial force sensors in such a manner that wires respectively connected to the two multi-axial force sensors are wound or unwound using a motor.

Figure 10:
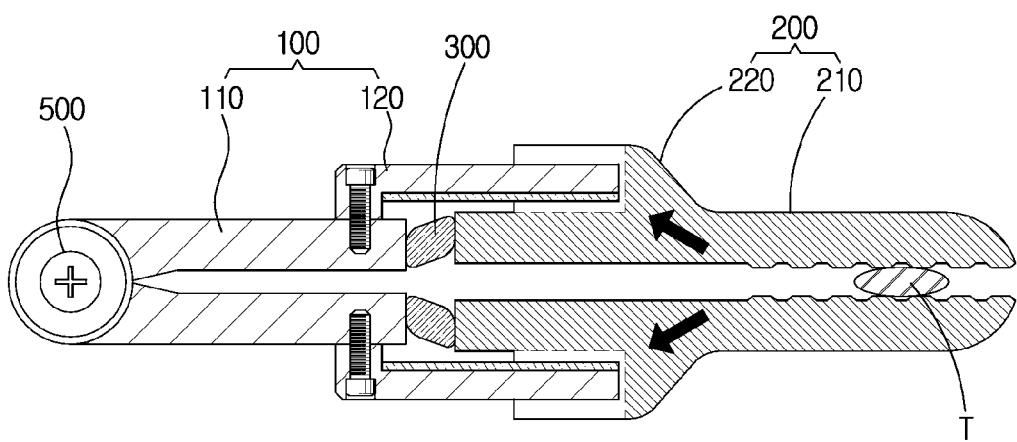

The motive power of the motive power section causes the two multi-axial force sensors to grasp an object as shown in FIG. 10.

The calculator obtains a value of multi-axial force applied to the two multi-axial force sensors based on the electrostatic capacity formed in the electrode section 400 when the two multi-axial force sensors perform a grasping operation.

To this end, the calculator may have a table where values of the multi-axial force are previously stored corresponding to the electrostatic capacities of the first electrode 410 and the second electrode 420 provided in the two multi-axial force sensors, and calculate shearing force in two directions (i.e. x- and y-axial force) and normal force (i.e. z-axial force) applied to the two multi-axial force sensors by comparing the electrostatic capacities measured in the first electrode and the second electrode with the values of the table.

As described above, there is provided a multi-axial force sensor that includes a first operating section, a second operating section, an elastic section and a sensing section and precisely measures force with a simple structure.

Further, there is provided a grasper for sensing multi-axial force, in which the multi-axial force sensors are coupled by a rotary shaft to form the grasper, and a calculator is used to obtain a value of multi-axial force with regard to external force based on information measured by the multi-axial force sensor, thereby solving a problem of damaging an affected area when force applied by the grasper is too strong.

Although a few exemplary embodiments of a multi-axial force sensor and a grasper for sensing multi-axial force using the same according to the present invention have been shown and described, it will be appreciated by those skilled in the art that changes may be made in these embodiments without departing from the principles and spirit of the invention, the scope of which is defined in the appended claims and their equivalents.

What is claimed is:

1. A multi-axial force sensor, comprising:
    an elastic section;
    a first operating section which comprises a first member and a first protrusion module protruding from a longitudinal side of the first member;
    a second operating section which comprises a second member and a second protrusion module protruding from a longitudinal side of the second member; and
    an electrode section formed in the first protrusion module,
    wherein the first protrusion module faces the second protrusion module,
    wherein a longitudinal end of the first member is connected to a longitudinal end of the second member by means of the elastic section,
    wherein the electrode section is configured to form an electrostatic capacity with the second operating section, in response to electric power being supplied to the electrode section, and
    wherein the electrostatic capacity changes in response to a multi-axial force being applied to the first operating section or the second operating section due to a change in a relative position between the electrode section and the second operating section.

2. The multi-axial force sensor according to claim 1, wherein
    the electrode section comprises
        a first electrode formed at an end of the first protrusion module and comprising two or more electrodes spaced apart at different angles, and
        a second electrode formed at a lateral surface of the first protrusion module and spaced apart from the first electrode,
    the first electrode forms an electrostatic capacity with the second protrusion module in response to electric power being supplied to the first electrode, and
    the second electrode forms an electrostatic capacity with the second member, in response to electric power being supplied to the second electrode.

3. The multi-axial force sensor according to claim 2, wherein
    the first protrusion module protrudes from the longitudinal side of the first member, and comprises an "L" shape,
    an end of the first protrusion module comprises a same shape as the first electrode, which forms a crossing angle, and
    the second protrusion module is spaced apart from and surrounds the end of the first protrusion module.

4. A grasper, comprising:
    a first multi-axial force sensor according to claim 3;
    a second multi-axial force sensor according to claim 3;
    a rotary shaft coupling another end of the first member of the first multi-axial force sensor and another end of the first member of the second multi-axial force sensor;
    a motive power section configured to supply motive power so that the first multi-axial force sensor and the second multi-axial force sensor perform a grasping operation; and
    a calculator configured to obtain the multi-axial force based on a change of the electrostatic capacity.

5. The grasper according to claim 4, wherein the calculator is further configured to calculate the multi-axial force by using a table containing values of multi-axial force and values of capacity corresponding to the values of the multi-axial force.

6. The multi-axial force sensor according to claim 2, wherein the first electrode is adjacent to the second protrusion module, and the second electrode is adjacent to the second member.

7. The multi-axial force sensor according to claim 6, wherein the second operating section further comprises a proximity module protruding from a corresponding surface of the second member which faces the second electrode.

8. A grasper, comprising:
    a first multi-axial force sensor according to claim 7;
    a second multi-axial force sensor according to claim 7;
    a rotary shaft coupling another end of the first member of the first multi-axial force sensor and another end of the first member of the second multi-axial force sensor;
    a motive power section configured to supply motive power so that the first multi-axial force sensor and the second multi-axial force sensor perform a grasping operation; and
    a calculator configured to obtain the multi-axial force based on a change of the electrostatic capacity.

9. The grasper according to claim 8, wherein the calculator is further configured to calculate the multi-axial force by using a table containing values of multi-axial force and values of capacity corresponding to the values of the multi-axial force.

10. The multi-axial force sensor according to claim 7, wherein a groove is formed in a surface of the second member which faces the first electrode.

11. A grasper, comprising:
    a first multi-axial force sensor according to claim 6;
    a second multi-axial force sensor according to claim 6;
    a rotary shaft coupling another end of the first member of the first multi-axial force sensor and another end of the first member of the second multi-axial force sensor;
    a motive power section configured to supply motive power so that the first multi-axial force sensor and the second multi-axial force sensor perform a grasping operation; and
    a calculator configured to obtain the multi-axial force based on a change of the electrostatic capacity.

12. The grasper according to claim 11, wherein the calculator is further configured to calculate the multi-axial force by using a table containing values of multi-axial force and values of capacity corresponding to the values of the multi-axial force.

13. A grasper, comprising:
    a first multi-axial force sensor according to claim 2;
    a second multi-axial force sensor according to claim 2;
    a rotary shaft coupling another end of the first member of the first multi-axial force sensor and another end of the first member of the second multi-axial force sensor;
    a motive power section configured to supply motive power so that the first multi-axial force sensor and the second multi-axial force sensor perform a grasping operation; and
    a calculator configured to obtain the multi-axial force based on a change of the electrostatic capacity.

14. The grasper according to claim 13, wherein the calculator is further configured to calculate the multi-axial force by using a table containing values of multi-axial force and values of capacity corresponding to the values of the multi-axial force.

15. The grasper according to claim 13, wherein the first multi-axial forces sensor and the second multi-axial force sensor are configured to rotate about the rotary shaft during the grasping operation.

16. The multi-axial force sensor of claim 1, wherein the two or more electrodes are disposed on a common surface of the first protrusion module.

* * * * *